(12) United States Patent
Marvin, III et al.

(10) Patent No.: US 7,415,437 B2
(45) Date of Patent: Aug. 19, 2008

(54) BUSINESS DEVELOPMENT PROCESS

(75) Inventors: Ernest A Marvin, III, Norwich, CT (US); Brian M. Hodor, North Kingstown, RI (US); Joseph M. Monti, Johnston, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1386 days.

(21) Appl. No.: 10/006,733

(22) Filed: Oct. 31, 2001

(65) Prior Publication Data
US 2003/0083914 A1 May 1, 2003

(51) Int. Cl.
*G06Q 40/00* (2006.01)
(52) U.S. Cl. .......................................... 705/37; 705/35
(58) Field of Classification Search ............... 705/10–44
See application file for complete search history.

(56) References Cited

U.S. PATENT DOCUMENTS 6,195,643 B1* 2/2001 Maxwell ..................... 705/10
6,292,830 B1* 9/2001 Taylor et al. ................ 709/224
2002/0198725 A1* 12/2002 Piepenbrink et al. ........... 705/1

OTHER PUBLICATIONS

Jason Karszes & Wayne Knoblauch "Five Points help evaluate new technology." Found at: http://www.dairybusiness.com/northeast/Feb01/5points.htm on Jul. 18, 2006 (4 pages total).*
PR Newswire. "Xpedian to Benefit from the X Internet." New York: Jul. 31, 2001, p. 1 (5 pages).*

* cited by examiner

*Primary Examiner*—Frantzy Poinvil
(74) *Attorney, Agent, or Firm*—James M. Kasischke; Michael P. Stanley; Jean-Paul A. Nasser

(57) ABSTRACT

A business development process utilizing a business development database comprises collecting data for ideas from a plurality of sources. One type of collected idea data from said step of collecting is filtered in order to identify potential business opportunities. An opportunity analysis is then performed on said identified potential business opportunities to determine valid business opportunities. Resources are committed to the valid business opportunities, a business proposal is developed. This developed business proposal to a potential buyers. Success of the submission is determined and the business opportunity is executed if the submission is a success.

14 Claims, 20 Drawing Sheets

*Enter a 1 where appropriate; leave blank if unsure.*

| Criteria | High Attractive | Assessment | Low Attractive | Assessment |
|---|---|---|---|---|
|  |  |  |  |  |
| Market: | Market-driven |  | Unfocused |  |
| Customers | Reachable |  | Loyal to others |  |
| User Benefits | <1 year payback |  | >3 year payback |  |
| Value Added | High |  | Minimal impact |  |
| Product Life | Durable |  | Perishable |  |
| Timing | With the tide |  | Against the tide |  |
| Market Structure: | Imperfect, emerging |  | Concentrated, declining |  |
| Funding Potential: | >$750K |  | <$500K |  |
| Potential Market Share: | Leader, >20% |  | <5% |  |
|  |  |  |  |  |
| *Industry and Market* | *Significant Capability* | 0 | *Incremental Improvement* | 0 |

FIG. 3

*Enter a 1 where appropriate; leave blank if unsure.*

| Criteria | High Attractive | Assessment | Low Attractive | Assessment |
|---|---|---|---|---|
|  |  |  |  |  |
| Time to Breakeven: | <2 years |  | >4 years |  |
| ROI Potential: | >25% |  | <15% |  |
| Capital Requirements: | Low to Moderate |  | High |  |
| Impact on Staffing: | Increase staffing, >2 WY |  | None |  |
| Room for Error: | Forgiving |  | None |  |
| Funding Structure: | Multi-Year |  | Single-Year |  |
|  |  |  |  |  |
| *Economics* | *Loose Constraints* | 0 | *Strict Constraints* | 0 |

FIG. 4

*Enter a 1 where appropriate; leave blank if unsure.*

| Criteria | High Attractive | Assessment | Low Attractive | Assessment |
|---|---|---|---|---|
| | | | | |
| Fixed and Variable Costs: | Lowest | | Highest | |
| Control over Costs, Prices, and Distribution: | Strong | | Weak | |
| Barriers to Entry: | Low to Moderate | | High | |
| Proprietary Protection | Have or can gain | | No Access | |
| Lead Time | Significant | | Aggressive competition | |
| Legal, Contractural | Proprietary or exclusivity | | None | |
| Contacts, Networks | Well Developed | | Limited | |
| KeyPeople | Top talent | | Unimpressive team | |
| WFPP | Executable | | Non-executable | |
| FMS | Approvable | | Non-approvable | |
| MOU | Executable | | Non-executable | |
| Technology/Concept: | Superior, groundbreaking | | Substitutes available | |
| | | | | |
| Competive Advantage | *Significant* | *0* | *Not evident* | *0* |

FIG. 5

*Enter a 1 where appropriate; leave blank if unsure.*

| Criteria | High Attractive | Assessment | Low Attractive | Assessment |
|---|---|---|---|---|
| | | | | |
| Entrepreneurial Team: | Visionary, radiates competence, listens | | Weak | |
| Industry or Technical Experience: | Top | | Weak | |
| Integrity: | Highest Standards | | Questionable | |
| Intellectual Honesty: | Know what they don't know and listen well | | Does NOT listen | |
| Stress Tolerance: | Thrives with pressure | | Low | |
| | | | | |
| Management team | *NUWC Core* | *0* | *Evident weakness* | *0* |

FIG. 6

*Enter a 1 where appropriate; leave blank if unsure.*

| Criteria | Potential Attractiveness | Assessment | Potential Flaw | Assessment |
|---|---|---|---|---|
| Real Customer | Yes | | No | |
| Under Promise-Over Deliver | Yes | | No | |
| Right Corporate Culture | Yes | | No | |
| Appropriate Team (Motivated, Correct Skills) | Yes | | No | |
| Is Market Correct? | Yes | | No | |
| Confident | Yes | | No | |
| Engineering of Product | Fine | | Over engineering | |
| Stress Test Properly | Yes | | No | |
| Good Sub Suppliers | Yes | | No | |
| Trying to Do Too Much | No | | Yes | |
| Experienced Team | Yes | | No | |
| Right Location | Yes | | No | |
| Price in Line With Competition | Yes | | No | |
| Market Window | Open | | Closed | |
| Competition | None | | Large competitor in our space | |
| Authority to Act Given to Team | Yes | | No | |
| Within Code of Federal Regulations | Yes | | No | |
| Fixed Price Contractually | Yes | | No | |
| Funding Prior To Work Startup | Yes | | No | |
| Resources Available | Yes | | No | |
| *Fatal Flaws* | *None / Mitigated* | *0* | *One or more* | *0* |

FIG. 7

Idea Name:                                              Originator:

Brief Description:

External Team Members:

| Step 1: Opportunity Analysis [originator] | | | | | (1) |
|---|---|---|---|---|---|
| | High Attractive | | Low Attractive | | |
| *Market* | 0 | Significant Capability | 0 | Incremental Improvement | |
| *Economics* | 0 | Loose Constraints | 0 | Strict Constraints | |
| *Competitive Advantage* | 0 | Significant | 0 | Not Evident | |
| *Team* | 0 | NUWC Core | 0 | Evident Weakness | |
| *Potential Flaws* | 0 | None / Mitigated | 0 | One or More | |
| *Overall:* | 0 | Opportunity (Proceed to Step 2) | 0 | Idea Needs More Work To Become Opportunity | |

| Step 2: Risk/Reward Assessment [originator] | | | | | (2) |
|---|---|---|---|---|---|
| | Rewards | | Risks | | |
| | 0 | Sustains/Grows Core Equity | 0 | New Product | |
| | 0 | Address Critical Need | 0 | New Customer | |
| | 0 | New Business Development | 0 | Cooperative Existing Customer | |
| | 0 | Competitive Advantage | 0 | Team | |
| | 0 | Increase Market Share | 0 | Time To Meet Milestones/Deliverables | |
| | 0 | Increase Professional Reputation | 0 | Funding Limited | |
| | | | 0 | Customer Pain | |
| | | | 0 | Internal Processes | |
| | 0.78 | Benchmark | 0.020 | Benchmark | |
| | 0.00 | Reward Assessment | 0.000 | Risk Assessment | |

Step 3: Final Assessment [Code 31B]

*GO* [ ]
*NO GO* [ ]
*MAYBE* [ ]

*STRATEGY:*

Code 31B Signature:                                     Date:

FIG. 8

RISK ASSESSMENT

Enter either a 1 (no risk), a 0 (high risk), or a number between 0 and 1 where you assess risk to be.

| Risk Factor | Benchmark | |
|---|---|---|
| New Product | 0.7 | 0 |
| New Customer | 0.1 | 0 |
| Cooperative Existing Customer | 1 | 0 |
| Team | 1 | 0 |
| Time to Meet Milestones/Deliverables | 0.9 | 0 |
| Funding Limited | 0.5 | 0 |
| Customer Pain | 0.7 | 0 |
| Internal Process | 0.9 | 0 |
| Total Risk | 0.02 | 0.00 |

Calculated Risk     Tough

| Risk Assessment |
|---|
| 0- 002 = Too High Risk  Do not do it |
| 002- 02 = High Risk  Talk To Customer |
| .02-0 2 = Tough, but Doable  Move ahead. |
| 2-1.0 = Low Risk. Go For It |

REWARD ASSESSMENT

Enter either 1 (Low reward), 2 (Moderate reward), or 3 (high reward)

| Reward Factor | Weight Factor | Benchmark | |
|---|---|---|---|
| Sustains/Grows Core Equity | 3 | 3 | |
| Address Critical Need | 2 | 2 | |
| New Business Development | 3 | 3 | |
| Competitive Advantage | 1 | 1 | |
| Increase Market Share | 1 | 1 | |
| Increase Professional Reputation | 2 | 2 | |
| Total Reward | | 0.78 | 0.00 |

Calibrated Reward.     Moderate

| Reward Assessment |
|---|
| 0 3 to 0.55 = Low |
| 0.55 to 0 80 = Moderate |
| 0 80 to 1 00 = High |

FIG. 9

Strategic Planning and Development Office
Request for Support to Divisions

| | | | | |
|---|---|---|---|---|
| I. | Code 31B Point of | | Date of | |

| Phone | | Fax | |
|---|---|---|---|

| E-Mail | |
|---|---|

| II. | Support Title | |
|---|---|---|

| III. | Logged into 31B Action Item | Log-in | |
|---|---|---|---|

| IV. | Request | |
|---|---|---|

31Bs Action
- ☐ Log into 31B Action Database
- ☐ Copy for 31B Task Book
- ☐ Send Copy to "Requestee"
- ☐ Send Copy to "Requestor"
- ☐ Provide Copy of Opportunity Analysis and Risk/Reward Assessment
- Notify 31B POC upon Initial:        Date:

Description of

V. Additional Information and Guidance

| Job Order Number | | Can Be Used | | Work Weeks |
|---|---|---|---|---|

| VI. | Request Due Date To Code 31B | |
|---|---|---|

Business Sensitive

FIG. 10

Proposal Capture Plan

*Opportunity Name:* _____
*Date:* _____
*Point of Contact:* _____

FIG. 11

The Buyer's Need
(A short, succinct description of what the buyer needs)

Notes.
① Projection of each viewgraph keeps everyone informed and involved and provides a central point for action items.
② Use different colored pen for action items.

FIG. 12

Information Required About the Need

| What information do we need to get? | How are we going to get it? | Action person assigned |
|---|---|---|
| | | |

FIG. 15

Information Required About the Buyers (What do we want to know about the buyers to make an opening statement in the first 18 to 39 seconds?)

| What information about the buyers do we want to get? | How are we going to get it? | Action person assigned |
|---|---|---|
| | | |

FIG. 16

Information Required About the Money Available

| What information do we need to get? | How are we going to get it? | Action person assigned |
|---|---|---|
| | | |

FIG. 17

Information Required on the Competition

| Likely competitors | What information do we need to get? | How are we going to get it? | Action person assigned |
|---|---|---|---|
| 1. | | | |
| 2. | | | |
| 3. | | | |
| 4. | | | |
| 5. | | | |
| 6. | | | |

FIG. 18

Assessing the Competition

| The Top Competitors | Strengths | Weaknesses |
|---|---|---|
| 1. | | |
| 2. | | |
| 3. | | |

Notes: • Provides info on other organizations in case we need to team up to get the "killer argument."
• Provides info on competitor weakness. Useful in "ghosting" the competition

FIG. 19

Internal Investment Required (What will it cost us to close this opportunity?)

1. Cost of people working on overhead supporting the marketing effort    $ _____
2. Travel costs    $ _____
3. Cost to provide free on-site people at the customer's site    $ _____
4. Internal Research and Development costs, e.g.    $ _____
   a. Software development
   b. Prototype costs
   c. Cost of demonstrations
5. Cost to write the proposal    $ _____
6. Other costs    $ _____

Total cost    $ _____

FIG. 20

Internal Return-on-Investment (ROI)

1. Expected revenue in first two years of funding $ _____
2. Anticipated profitability _____%
3. Internal investment required (from previous viewgraph) $ _____
4. Internal ROI $\left(\dfrac{\#1}{\#3}\right)$ _____

FIG. 21

Our Response to the Need

(What are we going to offer the buyer that will satisfy part or all of the need?)

FIG. 22

Return on Investment Analysis

(How quickly will our solution pay for itself? Or reduce or avoid costs?)
(Why should the economic buyer fund this solution?)

| ROI Analysis | Data Needed | Action Person Assigned |
|---|---|---|
|  |  |  |

FIG. 25

The Team

(What team do we need in order to have a "killer argument"?)
(Are there any strategic or political considerations?)

| Potential Teammate | Rationale |
|---|---|
|  |  |

FIG. 26

Who Is the Lead Salesperson(s) for Each Buyer

| Economic/Strategic Buyer<br>(Final approval to spend money) | User Buyer<br>(Will be the primary funder of our offering) |
|---|---|
| Technical/System Buyer<br>(Checks our offering to ensure it is technically correct and/or meets specifications) | Notes<br>Match up sellers and buyers based on:<br>- Personality types (match or mirror)<br>- Seniority level in the organization<br>- Level of technical knowledge |

FIG. 27

What is Our Pre-Selling Contact Plan?

(Who do we need to pre-brief?)

- Line up coaches
- Convince following people in our organization:
    1.
    2.
    3.
    4.
- Convince the following people who influence the buyers:
    1.
    2.
    3.
    4.

FIG. 28

Potential Questions and Objections and Our Responses

| Question/Objection | Response | Action Needed | Action Person Assigned |
|---|---|---|---|
|  |  |  |  |

FIG. 29

Several Appropriate Closing Proposal Approaches (Of the top 10 closing proposal approaches in use in the U.S. today, which ones are most appropriate to this buyer/opportunity? How would we use them?)

FIG. 30

Elements of Our Presentation (What will be the elements of a presentation if we have to give one, or if we need to leave info with the user buyer to influence the economic/strategic buyer?)

FIG. 31

BUSINESS DEVELOPMENT PROCESS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention generally relates to a business development process for assessing new business ideas, identifying risk and reward, opportunity analysis, developing proposals, and submitting the new business ideas to either new or existing customers.

(2) Description of the Prior Art

The current art for business development, particularly in the Department of the Navy, has been virtually nonexistent with the exception of individualized processes that may have been taking place. Accordingly, a need in the art exists for a sound business development process so that decisions can be more easily made while still pursuing new work. With changing times, funding has become more difficult to obtain and the competition for the funding has increased dramatically. With numerous ideas and limited resources, it was determined that a business development process was necessary to identify which ideas were worth pursuing.

The following patents, for example, disclose methods and systems for evaluating a variety of choices, but do not disclose a business development process for evaluating new business ideas within the context of determining the potential business outcome of those ideas.

U.S. Pat. No. 5,627,973 to Armstrong et al.;
U.S. Pat. No. 5,680,305 to Apgar, IV;
U.S. Pat. No. 5,717,865 to Stratmann;
U.S. Pat. No. 6,092,060 to Guinta et al.; and
U.S. Pat. No. 6,195,643 to Maxwell.

Specifically, Armstrong et al. discloses a method and apparatus for evaluating business opportunities for supplying goods and services (such as business forms and services) to potential customers, takes a quantitative approach that allows a user to evaluate a potential customer's needs, and the user's ability to supply those needs, to see what the area of opportunity for the user to supply that need is. Calculations can also be made comparing the user's ability to fulfill the needs to some absolute standard, to also determine an area of emerging technology. A series of questions relating to the customer's level of sophistication for predefined business techniques in a number of different categories are input into a computer, as well as the responses, and weights and values are assigned to the question responses to indicate a level of sophistication for each possible response of each business technique for each separate category. The user's capability of supplying the potential customer's needs are also evaluated and this data is input into a second computer which calculates, taking into account the weights and values, of each separate category, a potential customer's score, the user's score, and the area of opportunity (which is the difference between the customer's score and the user's score). Then, using a computer controlled printer, the calculations are printed out in graphical form on a sheet of paper, along with other human readable indicia, from which an evaluation of the opportunity, as well as a tool to close a business deal, are supplied.

The patent to Apgar, IV provides objective evaluations of a business entity's real estate situation and condition for use by customers including (but not limited to) the business entity. Information is processed to determine indicators of amount, price, area, grade, and risk; and those indicators are combined to provide a total score. The system includes a database for storing a variety of data, such as utilization measures and business information, and data corresponding to businesses that are similar to the business entity. Process actuators process the information to derive the several indicators, the score, and other measures, which is printed or displayed for customers and/or the business entity. Preferably, a report is generated which details information including the score to provide a well-rounded picture of a particular real estate situation.

Stratmann discloses a method for assisting an individual in making a selection amongst a plurality of choice items. The individual selects decision components having a relevance to the selection of a choice item and assigns values to each of the decision components. The user further assigns expected satisfaction scores to each decision component of each choice item indicating the expected satisfaction to be received from the decision components. The reliability of the expected satisfaction scores is indicated by assigned reliability factors. The assigned component values, expected satisfaction values, and reliability factors are then utilized to rank each of the choice items.

Guinta et al. discloses a method and apparatus for computer-aided assessment of an organizational process or system. The method and apparatus are adapted to display computer-displayed questions to an assessor, who then inputs numerical inputs relative to the assessor's perception of the process or system. Filtering techniques inhibit entry of unsupported numerical inputs that may be untrue and/or exaggerated. Sequential questions used in combination provide a more accurate assessment of the system or process, thereby enabling focused audits and/or inspections.

The patent to Maxwell discloses a decision making system whereby a method of performing a detailed level evaluation of one or more products or articles based on a decision maker's response to one or more questions relating to the decision maker's requirements is described. The method includes the decision maker responding to the question relating to the decision maker's functional requirement or requirements taking into account a predefined result type. The response is compared with a product result where the product result reflects a particular functional capability of the article or product in relation to the particular question. This produces an evaluation ratio or series of evaluation ratios that are statistically analyzed to determined how well the product or article meets the decision maker's requirements. The method is particularly suitable for analysis of software packages such as accounting packages and the like and provides a way by which a user may determine, at a highly detailed level, the suitability of various packages to the user's requirements.

It should be understood that the present invention would in fact enhance the functionality of the above patents by providing a business development process that allows innovators to pursue ideas and determine whether the opportunities for any particular idea are real and worth an investment of time and money to those responsible for development. The process allows for a better commitment of resources and effort. This leads to a much better return on investment due to efficient resource allocation and invites more effective strategic planning, commitment of resources and overall planning.

SUMMARY OF THE INVENTION

Therefore it is an object of this invention to provide a business development process that provides a standard process for an entire company.

Another object of this invention is to provide a business development process that identifies criteria relevant to investing in business opportunities for a company.

Still another object of this invention is to provide a business development process that provides effective strategic planning, commitment of resources, and overall planning for a company.

A still further object of the invention is to provide a business development process that is easily established on a known database and therefore usable by all relevant employees.

Yet another object of this invention is to provide a business development process that assesses risks and rewards, compares the assessment to a baseline of proven successful business opportunities, and directs subsequent steps of the process.

In accordance with one aspect of this invention, there is provided a business development process including the steps of (a) collecting data for ideas from a plurality of sources, (b) filtering one type of collected idea data from the step of collecting in order to identify potential business opportunities, (c) performing an opportunity analysis in order to identify an opportunity from all of the filtered and collected data ideas to determine valid business opportunities, (d) committing resources to the determined valid business opportunities, (e) developing a business proposal for the determined valid business opportunities, (f) submitting the developed business proposal to a potential buyer of the determined valid business opportunity, (g) determining if submission of the developed business proposal is a success, and (h) executing the business opportunity upon determining that the submission is a success.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

FIG. 3 is a market evaluation worksheet for use in an opportunity analysis stage of FIG. 1;

FIG. 4 is an economic evaluation worksheet for use in the opportunity analysis stage of FIG. 1;

FIG. 5 is a competitive advantage evaluation worksheet for use in the opportunity analysis stage of FIG. 1;

FIG. 6 is a team evaluation worksheet for use in the opportunity analysis stage of FIG. 1;

FIG. 7 is a potential flaw evaluation work sheet for use in the opportunity analysis stage of FIG. 1;

FIG. 8 is a cover sheet for use in summarizing information from individual worksheets;

FIG. 9 is a worksheet for determining risk/reward in a risk/reward assessment stage of FIG. 1;

FIG. 10 is a task sheet used if a certain decision step in FIG. 1 is affirmative;

FIGS. 11-31 are worksheets for use in a capture plan stage of FIG. 1; and

DESCRIPTION OF THE PREFERRED EMBODIMENT

In general, the present invention is directed to a process for allowing innovators to pursue ideas, and determine the value of opportunities that have presented themselves. This promotes more innovation, as engineers can better understand where their ideas go and how they are developed. Additionally, this process assesses the risks and rewards, compares that assessment to a baseline of proven successful opportunities, and provides insight to what the next step should be. This invites more effective strategic planning, commitment of resources, and overall planning for certain businesses.

Figure 1:
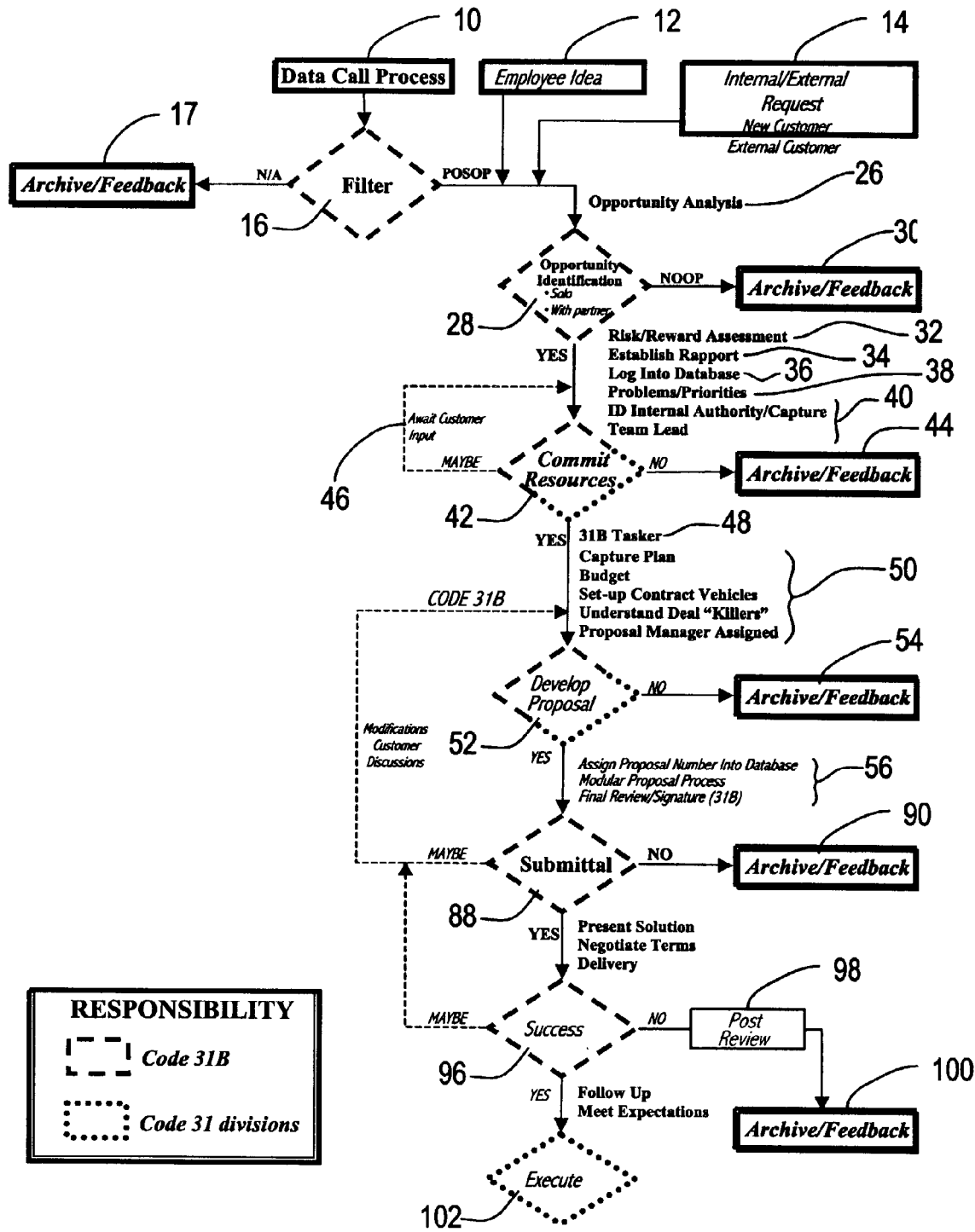
FIG. 1 is a flow diagram of a business development process according to a preferred embodiment of the present invention.

Referring first to FIG. 1, the business development process is shown to encompass seven major steps including: Filter; Opportunity Identification; Commit Resources; Develop Proposal; Submittal; Success; and Execute. These steps bring an idea from initial identification through project execution. An idea can come from one of three general sources including a formal data call process 10, an employee 12, or from a request 14 that is either internal or external. The request at 14 can be either from an existing customer or a new customer.

In the event that an idea comes from a formal data call at step 10, the idea needs to be filtered at "Filter" (step 16) before moving to the next step. The step of filtering is not performed, however, on idea submissions coming from an employee idea at step 12 or an internal/external request at step 14. Filtering of the formal data call ideas helps to identify the division and/or personnel that can respond to the data call.

Figure 2:
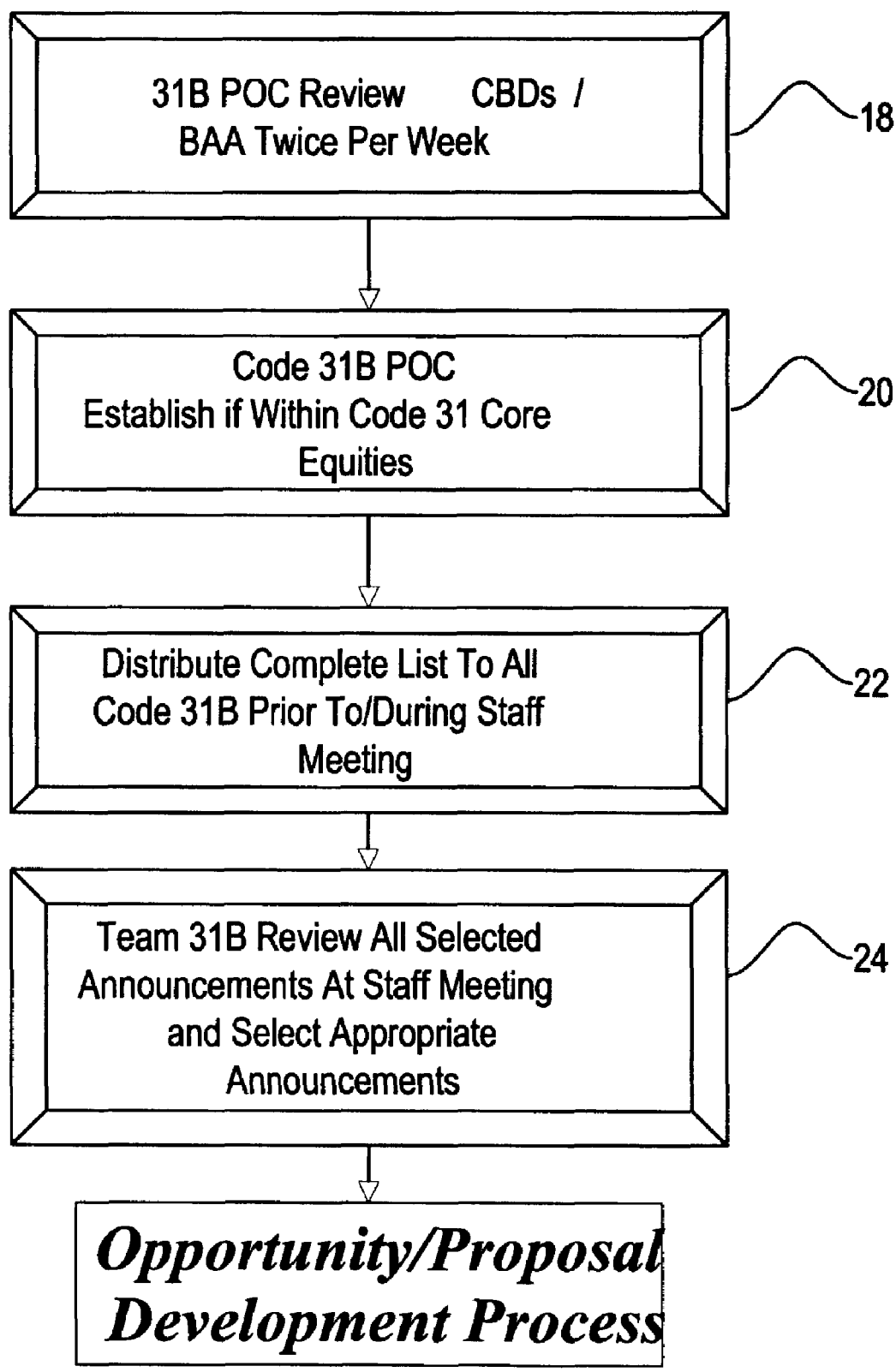
FIG. 2 is a flow diagram of a filtering process from FIG. 1 according to the present invention.

The filtering process, the first of the major steps and identified at 16 in the flow diagram, is shown in the detail flow diagram of FIG. 2. The ideas from the formal data call process 10 are received through publication such as the Commerce Business Daily (CBD) and Broad Agency Announcement (BAA) process. A designated point of contact (POC) will, at step 18, review the Commerce Business Daily and Broad Agency Announcement calls twice weekly for possible ideas and business opportunities. A second individual will determine, at step 20, if the idea collected from the data call is within the core equities of a group. It should be understood that in this instance the group refers to the Surface Undersea Warfare Department of the Navy. The group includes a smaller business development group that is responsible for bringing in new business. The core equities for the example group, the Surface Undersea Warfare Department, include, but are not limited to, Scientific (active and passive signal processing, environmental acoustics, information processing, and acoustic modeling) and Sonar System Engineering (array design, towing and handling systems, rapid prototyping, shipboard installation, test and evaluation, training, in-service engineering, system integration, requirements analysis, and system concept development). The center core equity is Surface Undersea Warfare. It will be appreciated to those skilled in the art that the disclosed business development process, while attributed to this specific department of the Navy, will be easily adapted to virtually any similar type of company, either military or civilian.

Continuing, a complete list of announcements that fall within the group's core equities will be distributed, at step 22, to the business development group for review at a weekly Strategic Planning and Development Office (SPDO) staff meeting. The group will select those announcements, at step 24, that will move to the next step in the development process. Ideas that are not recommended i-or continuation are archived at step 17 (see FIG. 1) for potential review at a later date.

At this point, those ideas that continue in the process undergo an opportunity analysis to determine whether the idea is a business opportunity for the department. The opportunity analysis stage is identified at 26 in the flow diagram of FIG. 1 and is further set forth in the worksheets of FIGS. 3 through 8. In the opportunity analysis, five areas are analyzed including: the Market (FIG. 3); Economics (FIG. 4); Competitive Advantage (FIG. 5); the Team (FIG. 6); and Potential Flaws (FIG. 7).

In the preferred embodiment, each area of analysis is represented by a worksheet available in a computer spreadsheet program such as Microsoft Excel® or the like. The coversheet shown in FIG. 8 contains a summary of information from the individual worksheets and user data. The originator fills in the coversheet with the idea name, the originator's name, a brief description of the idea, and any external team members involved in the analysis. An idea can be entered in the process with or without team members to determine if a business opportunity exists or if there is value added. The originator then proceeds to the five worksheets, FIGS. 3-7, one for each of the areas to be analyzed. Using a computer having a business development database and including the Excel worksheets described herein, the originator is directed to enter a "1" in an assessment column beside each attribute on the computer worksheet where the attractiveness exists. The space is to be left blank if the assessment factor is not clear or is questionable. The column total will automatically appear on the bottom row and in the appropriate box on the coversheet and is calculated by the spreadsheet computer program.

The first of the five worksheets is shown in FIG. 3 and is directed to the Market as it relates to the opportunity analysis. Criteria in the market include the general Market per se with subcategories of Customers, User Benefits, Value Added, Product Life, and Timing. Each of these criteria includes certain attributes. For example, a market that is market driven is considered "high attractive", and a market that is unfocused is considered "low attractive." The customer having high attractive criteria is one that is reachable, whereas a customer with low attractive criteria is one that is loyal to others. A high attractive user benefit is one with less than a one-year payback, and a low attractive user benefit is one with a payback greater than three years. For the value added criteria, there is a high attractive value if the value added is high and a low attractive value if the value added has minimum impact. With regard to product life, a durable product is more attractive than a perishable product. Finally, if the timing is "with the tide" a high attractive value is given, and if the timing is "against the tide", then a low attractive value is given.

For an imperfect or emerging market structure, a high attractive value exists but for a concentrated, declining market structure, a low attractive value is entered. The funding potential ranges are given to be greater than $750K or less than $500K as the high or low attractive values. It is apparent that these ranges may vary depending upon the economics of the times. Finally, if the potential market share would be that of a leader, or more than 20% of the market, a high attractive value exists. For potential market shares of less than 5%, a low attractive value exists.

The bottom line of this (and subsequent) worksheet is a summary of the items for the worksheet. The computer calculates the Assessment summary for each Assessment column, and places the sum of the assessments on the bottom line. The bottom line numbers are automatically placed on the master or cover sheet of FIG. 8 as will be more fully explained below.

Referring now to the worksheet of FIG. 4, the Economic attractiveness of a business opportunity is valued. The areas of analysis (criteria) include Time to Break Even, Return on Investment (ROI) potential, Capital Requirements, Impact on Staffing, Room for Error, and Funding Structure.

Ranges for time to break even are between two and four years. Less than two years is in the high attractive category and greater than four years is in the low attractive category. If the return on investment is greater than 25%, then a high attractive mark is given and if less than 5%, a low attractive mark is given. In order to gain a high attractive rating, capital requirements should be low to moderate whereas a high capital requirement will receive a low attractive rating. Should there be an increase in staffing of more than two employees per year, then a high attractive value is given, but if there is no impact on staffing, a low attractive value is given. With regard to room for error, this should be forgiving in a high attractive situation. If there is no room for error, then the project is considered to be a low attractive one. Finally, if funding structure permits a multi-year funding ability, then the project is high attractive, and if there is a single year funding requirement, the project is in the low attractive category.

The analysis worksheet for competitive advantage of a business opportunity is shown in FIG. 5 and includes numerous criteria such as fixed and variable costs; control over costs, prices, and distribution: barriers to entry (such as proprietary protection, lead time, legal/contractual, contacts/networks, key people, work for private parties (WFPP), foreign military service (FMS), and memorandum of understanding (MOU)); and technology/concept.

In connection with the fixed and variable costs, a low value of these is high attractive, whereas a high value of these is low attractive. To obtain high attractive, there must be strong control over costs, prices, and distribution, whereas a weak control thereof is low attractive.

Of the barriers to entry into the market, there should presently be or ability to gain access to proprietary protection for high attractive. If there is no access to proprietary protection, then low attractive exists. A significant lead-time ahead of the competition is high attractive, and aggressive competition is low attractive. If there is proprietary or exclusivity with regard to legal/contractual availability, this is high attractive, but if there is no legal/contractual availability, then the project is low attractive.

In the case of contacts and networks, these will be well developed for a high attractive rating, but if they are limited, there will be a low attractive rating. Further, if the key people for the project are top talent, then the project is high attractive. If the key people are an unimpressive team, then the project is low attractive. If the business opportunity is executable work for private parties (WFPP), it is high attractive, and if it is non-executable work for private parties, it is low attractive. Work for private parties is a Government agency requirement that may be omitted for commercial enterprises. If foreign military sales are approvable, then a high attractive score is given, but if they are non-approvable, a low attractive score is given. Continuing, if a memorandum of understanding (MOU) is executable, it is high attractive, but if it is non-executable, it is low attractive. Both FMS and MOU criteria are known in the defense industry. These criteria can be replaced with the relevant criteria for other industries.

If the technology or concept for the business opportunity is a superior or groundbreaking one, then it is a high attractive project. However, if the technology or concept is one for which substitutes are available, then the project will receive a low attractive rating for the given criteria. Looking now at FIG. 6, there is shown a worksheet relating to an assembled team in connection with the opportunity analysis. Criteria include an entrepreneurial team, industry or technical experience, integrity, intellectual honesty, and stress tolerance. If the entrepreneurial team has vision, radiates competence, and listens, then a high attractive mark is given and if the team is weak, then a low attractive score is given. If the team has top-notch industry or technical experience, then it is given a high attractive rating, and a low industry or technical experience yields a low attractive rating. A high attractive rating is given for those with the highest standards of integrity and a low attractive rating is given if the integrity is questionable.

As for intellectual honesty, a high attractive team is one that knows what it doesn't know and listens well, whereas a team that does not listen is a low attractive team. A team that thrives with pressure is considered a high attractive and one that has a low stress tolerance is a low attractive. The computerized calculation will identify if the management team is a core team or if there is any evident weakness of the team.

FIG. 7 pinpoints criteria that will identify a potential flaw in the opportunity analysis. These criteria include whether the process is dealing with a real customer, if it is possible to under promise—over deliver, if it is the right corporate culture, an appropriate team with motivation and the correct skills is assembled, questioning whether the market is correct, confidence in general, the level of engineering of a product, if a stress test has been properly conducted, if there are good subcontracting suppliers, if the project/team is trying to do too much, if the team is experienced, if the product is in the right location, if the price is in line with the competition, whether or not the market window is open or closed, if there is competition or a large competitor in that desired space, if authority to act has been given to the team, if the project is allowable within the existing regulatory framework (represented for Government agencies as the Code of Federal Regulations), if the price is fixed contractually, if funding will occur prior to work startup, and if resources for the project are available. Each of these criteria are addressed in general with a yes or no answer and the assessment will lead to a computerized determination of fatal flaws being none/mitigated, or one or more flaws.

Once the five worksheets are completed, an overall score will appear on the coversheet of FIG. 8. The overall score is computed by grading plural criteria of strengths and weaknesses of the identified potential business opportunity. The grading occurs in the areas of the market, economics, competitive advantage, the team, and potential flaws. Preferably this grading occurs by assigning a numeric value to each criteria according to the project parameters on a dedicated worksheet for each area. The score is computed for each worksheet and the computed score is transferred to the coversheet where it is summed. Interpretation of that score is depicted in Table 1.

TABLE 1

Idea vs. Opportunity Scores

| Overall Value | Outcome |
|---|---|
| Opportunity value >> Idea value | Possible opportunity |
| Idea value >> Opportunity value | Idea only |
| Opportunity value = Idea value | Possible opportunity |
| Opportunity value > Idea value | Possible opportunity |
| Idea value > Opportunity value | Requires additional information to become a possible opportunity |

Note: >> = much larger value; > = slightly larger value.

Referring now to step 28 of FIG. 1, Opportunity Identification determines whether the idea is an opportunity or no opportunity (NOOP). If the idea is determined to be NOOP, it is archived in the business development database at step 30 and feedback is provided to the originator. If the idea is determined to be an opportunity, then a number of tasks need to be performed beginning with the risk/reward assessment at step 32.

The Risk/Reward Assessment tool is illustrated in FIG. 9. This worksheet is generated by the computer spreadsheet program in conformance with preprogrammed instructions. The worksheet is divided into two sections, one for risk assessment and one for reward assessment. For risk assessment, a number between 0 (high risk) and 1 (low risk), in increments of one-tenth, is entered for each risk factor. The risk factors are: New Product; New Customer; Cooperative Existing Customer; Team; Time to Meet Milestones/Deliverables; Funding Limited; Customer Pain; and Internal Process.

There are benchmarks given for each of the risk factors as shown in the chart containing the risk assessment portion of FIG. 9. When entering a number into the computerized worksheet representative of the particular risk factor, the benchmark given will be taken into consideration so that an analysis can be made at which side of and how far from (or close to) the benchmark a particular risk factor is. This simplifies the analysis for the assessor.

The numbers are multiplicative; therefore, assigning a 0 to a factor will put the total risk at 0. Table 2 indicates the assigned thresholds for risk assessment based on the total risk calculated.

TABLE 2

Risk Assessment

| Total Risk Threshold | Assessment | Action |
|---|---|---|
| 0-0.002 | Too High Risk | Do Not Do It |
| 0.002-0.02 | High Risk | Talk to the Customer |
| 0.02-0.20 | Tough, but doable | Move ahead |
| 0.2-1 | Low Risk | Move ahead |

The risk criteria values of table 2 can be adjusted through experience with successful and unsuccessful opportunities. For the reward assessment, a 1 (low reward), 2 (moderate reward), or 3 (high reward), in increments of whole integers, is assigned to each of the following reward factors: Sustains/Grows Core Equity; Addresses Critical Need; New Business Development; Competitive Advantage; Increases Market Share; and Increases Professional Reputation.

The reward assessment is a process that is evaluated in relation to prior projects that have been benchmarked based on their success. Table 3 below indicates the thresholds for reward assessment based on the total reward calculated.

TABLE 3

Reward Assessment

| Total Reward Threshold | Assessment | Action |
|---|---|---|
| 0.3-0.55 | Low Reward | Probably not do it; however, review risk, talk to customer, and determine future work. |
| 0.55-0.8 | Moderate Reward | Move ahead based on risk analysis. |
| 0.8-1 | High Reward | Move ahead based on risk analysis. |

At this point, the data from the worksheet are tallied and entered in the corresponding area of the coversheet of FIG. 8. As above these reward criteria can be assessed with view to the goals of the organization as the business development process is utilized.

From here, a potential customer must be identified at step 34, and discussions should then begin with that customer to establish a rapport. It is important to work with this customer in a proactive, not reactive way. At this early stage, a presentation should be avoided unless, of course, the customer desires a briefing. This opportunity is entered in the business development database at step 36 for tracking and balanced scorecard assessment. Any problems or priorities are identified and noted at step 38. At step 40, a capture team is identified and a lead, usually the originator, is assigned.

The decision to commit resources, step 42, is jointly determined by the business development group and the appropriate larger organization. If the decision is not to commit resources (NO), relevant information is added to the business development database and feedback is provided to the capture team (originator) at step 44. If the response is "MAYBE", customer input is awaited at step 46. If the decision is to commit resources (YES), the process advances to step 48 and a task sheet (Request for Support to Divisions) is forwarded to the appropriate division requesting support. An example of the task sheet is shown in FIG. 10.

Prior to receiving the task sheet, discussions will have taken place in the division to determine staffing, funding, and any other issues. The task sheet is never supplied to the division without prior notice. At the time of forwarding the task sheet of FIG. 10, a capture plan is filled out at step 50. The capture plan work sheets are shown in FIGS. 11 through 31. The capture plan is a series of worksheets that can be viewed as a workbook, where the applicable information is self-explanatory. When completed, this plan provides an information package to assist in the development of a proposal and for archival reference concerning the business opportunity.

Figure 13:
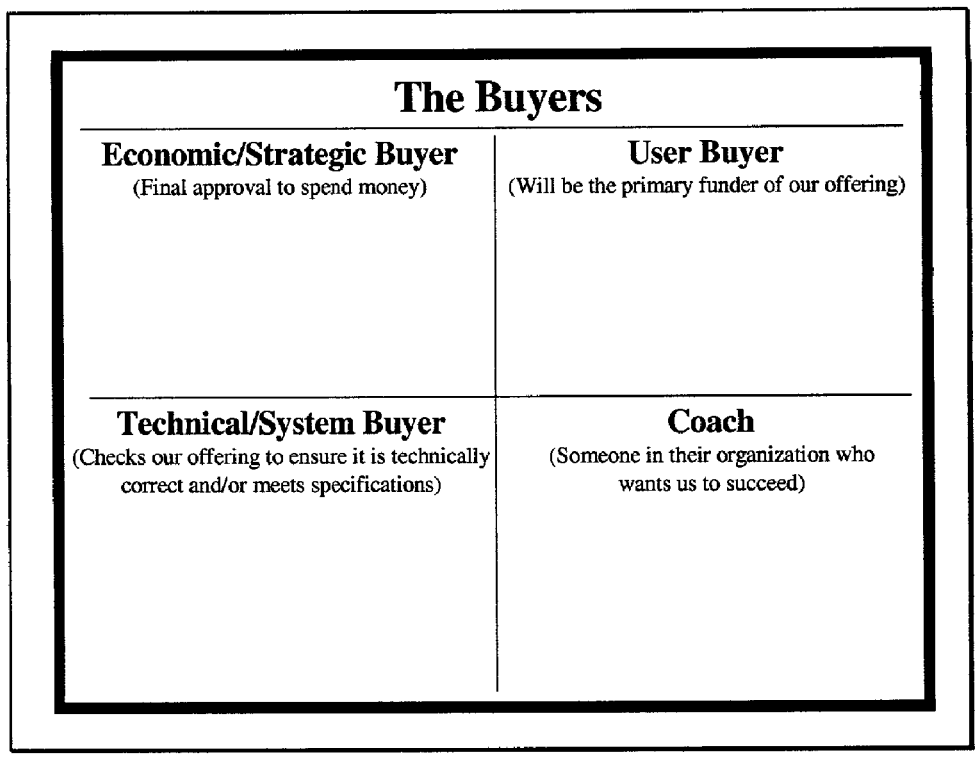

By way of explanation, the proposal capture plan "workbook" begins as shown in FIG. 11 with a cover sheet including the Opportunity Name, the Date, and the Point of Contact. FIG. 12 is a worksheet enabling a short, succinct description of what the buyer's needs are. FIG. 13 is a worksheet categorizing the buyers. The buyers include the economic/strategic buyer—one who has final approval to spend money, the user buyer—who will be the primary funder of the offering, the technical/system buyer—the one who checks the offering to ensure that it is technically correct and/or meets specifications, and the coach—someone in the buyer organization who wants the seller to succeed.

Figure 14:
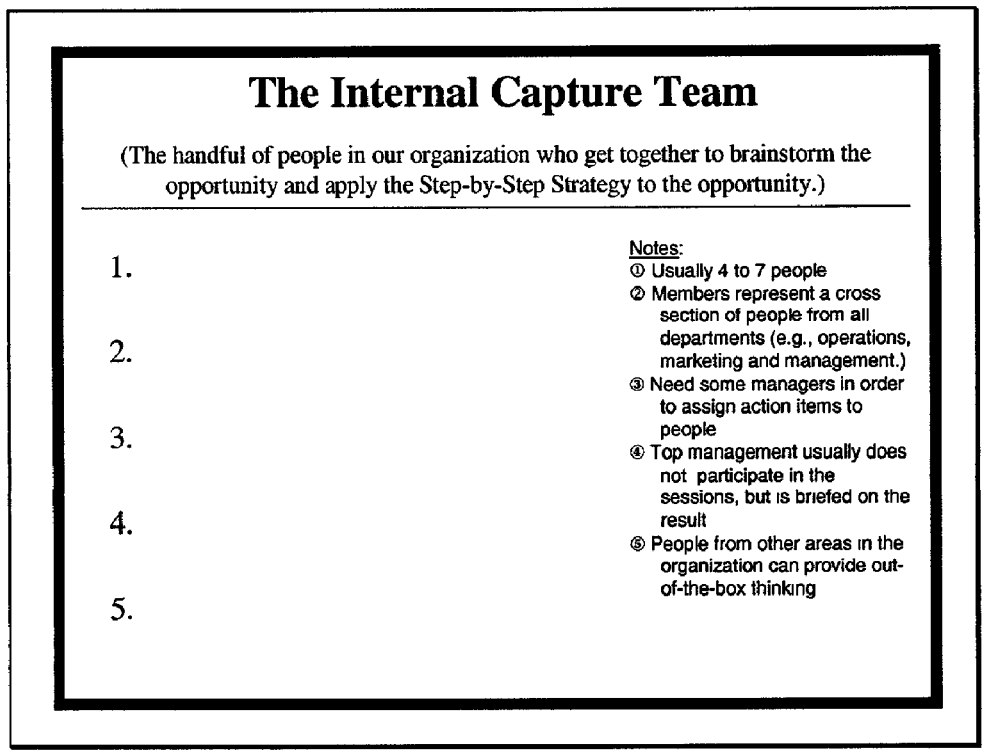
Figure 23:
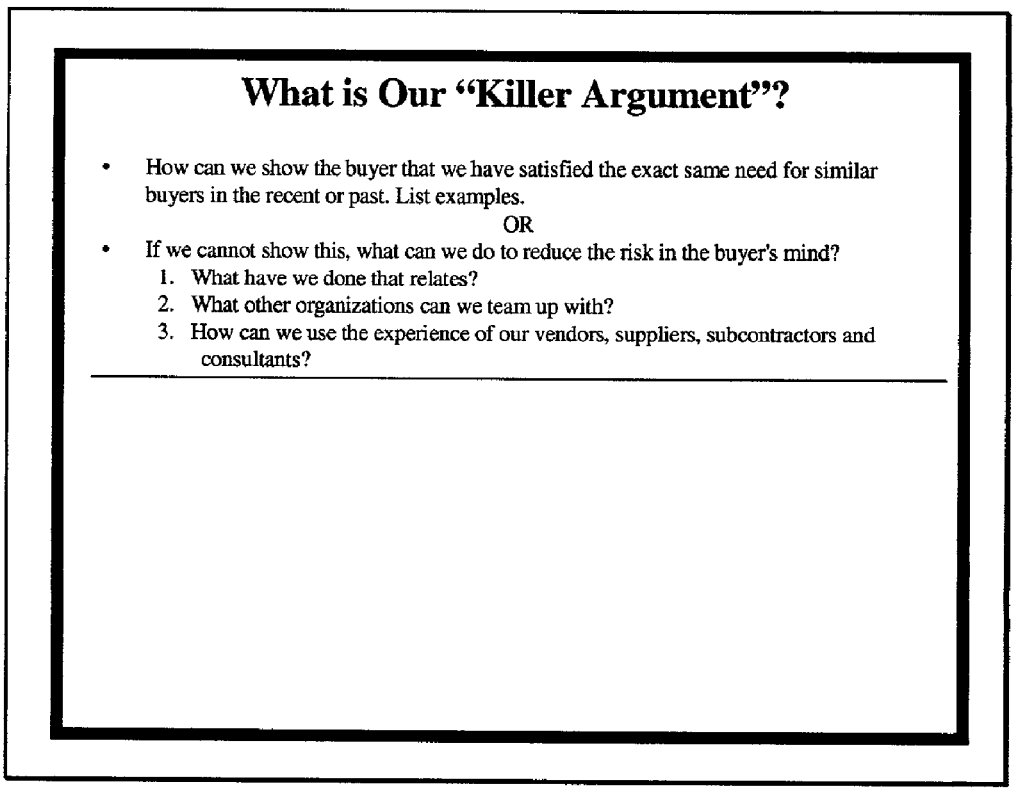

FIG. 14 is the worksheet that assists in the assembly of the internal capture team. This team will include a handful of people in the selling organization who get together to brainstorm the business opportunity and apply the step-by-step strategy to the opportunity. The internal capture team usually consists of four to seven people whose members represent a cross section of people from all departments of the company. This team will necessarily include some managers in order to assign action items to people. Top management usually does not participate in the sessions but is briefed on the result. In addition, people from other areas in the organization can provide out-of-the-box thinking to the team.

FIG. 15 is a worksheet that will contain information needed to pursue the customer. Questions such as "what information do we need?" and "how are we going to get it?" will be answered by an action person assigned to any particular need question.

The worksheet of FIG. 16 addresses information required 12 about the buyers. This information collected will specifically answer the question "what do we want to know about the buyers to make an opening statement in the first 18 to 39 seconds?" An action person is assigned to determine what information is needed and how to get it.

A worksheet identifying what information is needed about the money available and how it will be obtained is found in FIG. 17. Once again, an action person is assigned to complete this worksheet.

The information required on the competition is summarized on the worksheet found in FIG. 18. Here, a list of likely competitors is generated, and an action person assigned to the worksheet will determine what information is needed about the competitor(s) and how it will be obtained. Next, the competition is assessed in the worksheet of FIG. 19, including the strengths and weaknesses of the competition. This worksheet is useful in providing information on other organizations in case it is necessary to team up to get a "killer argument" which is identified as the best possible argument. It also provides information on competitor weaknesses that may be useful in "ghosting" or anticipating the competition.

An internal investment will be required and the worksheet of FIG. 20 assists in determining the cost to close the opportunity in question. Specifically, dollar figures will be given to items including the cost of people working on overhead and supporting the marketing effort, travel costs, cost to provide free on-site people at the customer's site, and internal research and development costs such as software development, prototype costs, and cost of demonstrations. Additionally, the cost to write the proposal and any other costs will be determined.

In FIG. 21, a worksheet for determining an internal return-on-investment is shown. This worksheet essentially provides a formula of the return-on-investment which is the expected revenue in the first two years of funding divided by the internal investment required (from FIG. 20). The anticipated profitability is presented as a percent.

FIG. 22 is a worksheet for identifying the response to the need. In other words, the seller identifies what it is going to offer to the buyer that will satisfy part or all of the buyer's need. Additionally, a worksheet identifying a "killer argument" will be prepared. This worksheet, shown in FIG. 23 examines how the seller can show the buyer that they have satisfied the exact same need for similar buyers recently or in the past by listing examples. If this cannot be shown, it must be determined what can be done to reduce risk in the buyer's mind. To identify what can be done, the seller addresses things that have been done related to the need; other organizations available for teaming with the seller; and the seller's use of experiences held by its vendors, suppliers, subcontractors and consultants.

Figure 24:
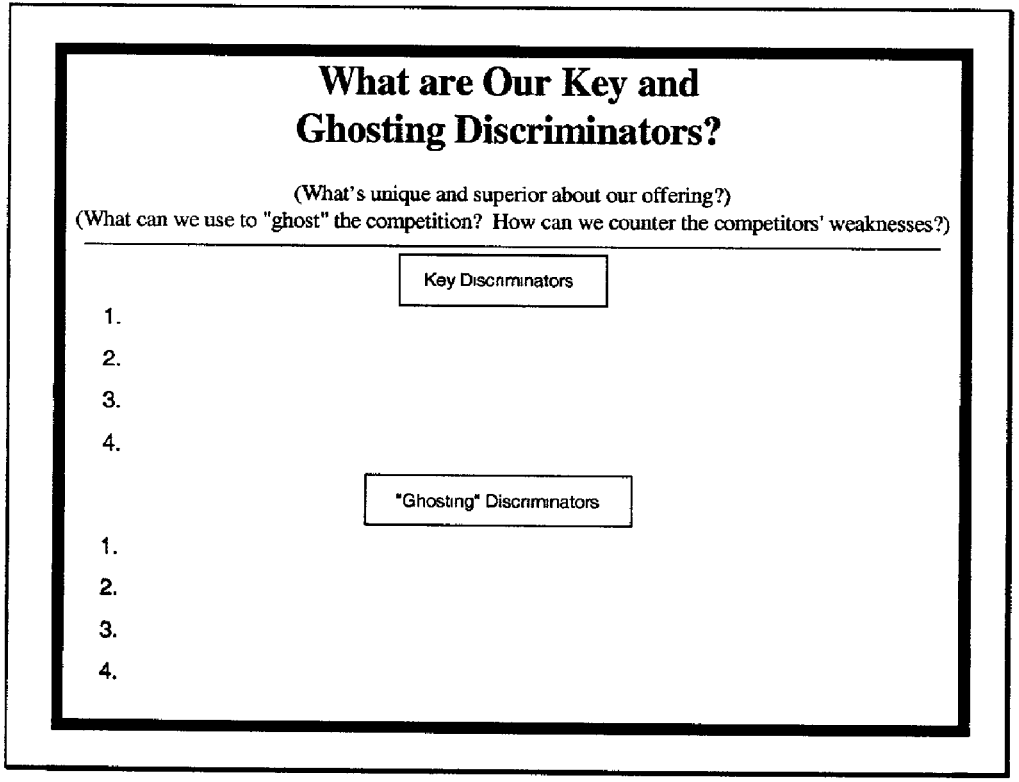

The worksheet of FIG. 24 identifies key and ghosting discriminators. For example, it is determined what is unique and superior about the seller's offering, what can be done to "ghost" the competition, and how the competitors' weaknesses can be countered.

A return on investment analysis is performed in the worksheet of FIG. 25. Here, considerations are evaluated including how quickly the solution will pay for itself, how costs can be reduced or avoided, and why should the economic buyer fund the solution. An action person is assigned to obtain the data needed to perform this return on investment analysis.

FIG. 26 is a worksheet to assist in assembling a team that can produce a "killer argument". Strategic or political considerations are weighed in selecting this team. Potential teammates are identified with a rationale given for each.

FIG. 27 is a worksheet identifying each of the lead salespersons for each of the economic buyers. As identified above, these economic buyers include the economic/strategic buyer, the user buyer, and the technical/system buyer. The sellers and buyers should be matched up based on personality types that match or mirror, seniority level in the organization, and a level of technical knowledge.

A worksheet for developing a pre-selling contact plan is shown in FIG. 28. The pre-selling contact plan questions who needs to be pre-briefed, lines up coaches, identifies people in the selling organization who need to be convinced of the merits of the proposal, and similarly identifies people who influence the buyers and need to be convinced of the merits of the proposal.

Potential questions and objections and the responses thereto are identified in the worksheet of FIG. 29. An action person is assigned to one or more of the identified questions/objections, determines a response, and the action needed.

The worksheet of FIG. 30 assists in the preparation of several appropriate closing proposal approaches. These are chosen from the top closing proposal approaches currently in use and are evaluated by estimated importance to this buyer/opportunity. A plan for using the approach is also formulated.

FIG. 31 is a worksheet directing itemization of the elements of the seller's presentation, including any information that would need to be left with the buyer to influence the economic/strategic buyer should that become necessary.

Figure 32:
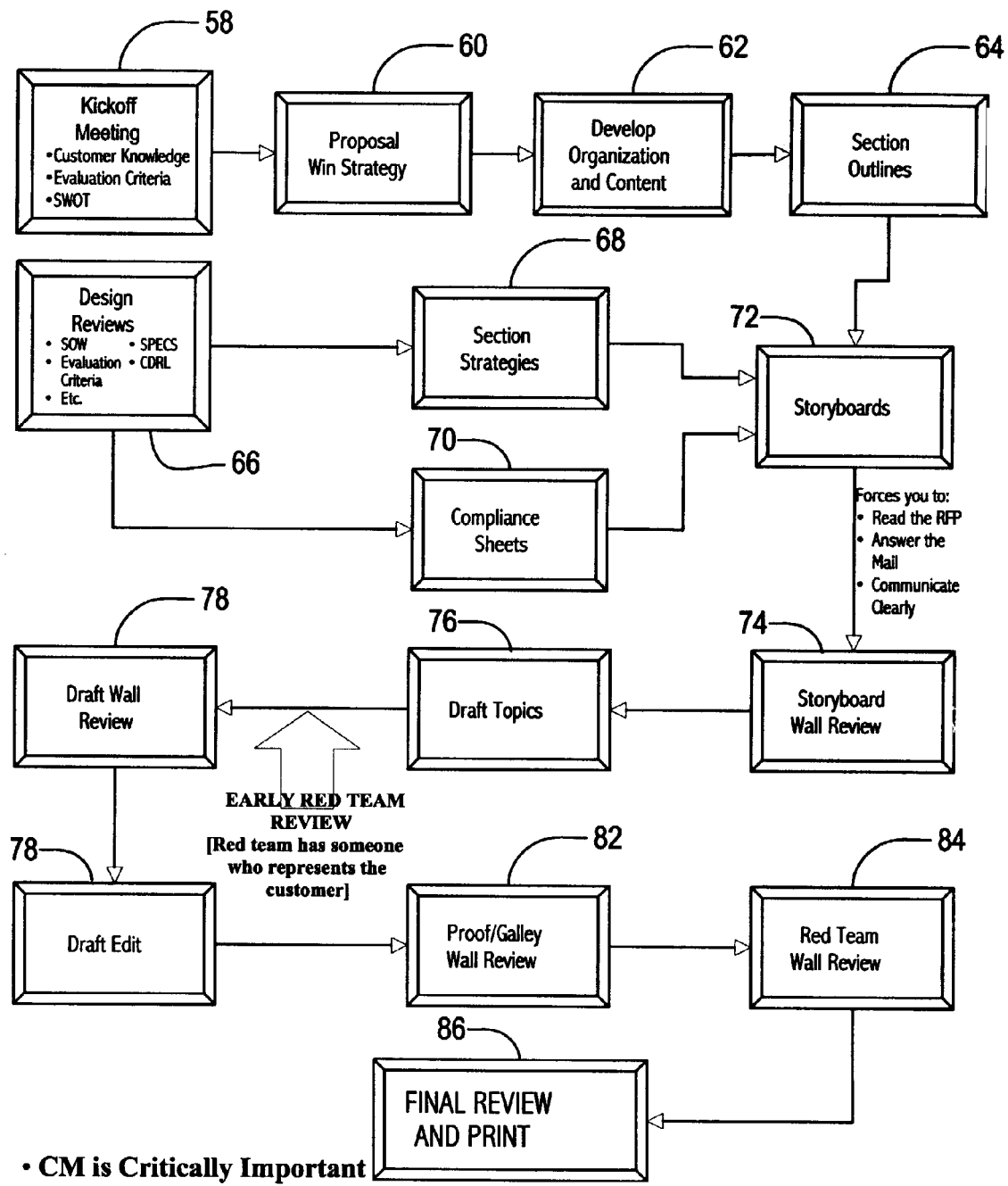
FIG. 32 is a flow diagram of a proposal development step of FIG. 1.

Referring back to FIG. 1 in step 52, it is determined if a proposal will be developed. If a decision is made to forego the development of a proposal, the information gathered to date is entered in the business development database and appropriate feedback is provided to the capture team at step 54. If a decision is made to develop a proposal, step 56 includes the assignment of a proposal number, which is entered in the business development database, writing of the proposal by selected personnel in the core department and the division, and final review conducted by the core department. The guide for a modular proposal process is shown in FIG. 32.

The modular proposal process begins at step 58 with a kickoff meeting discussing issues such as customer knowledge, evaluation criteria, and "Strengths, Weaknesses, Opportunities, and Threats" (SWOT). The kickoff is followed at step 60 by a proposal win strategy discussion in which a successful strategy is outlined. Next, organization and content of the proposal are developed at step 62, followed by the preparation of section outlines at step 64.

Design reviews are separately conducted of the project at step 66 and the results of these reviews are applied to section strategies at step 68 and compliance sheets at step 70. The data gathered with the section strategies and compliance sheets are input into storyboards at step 72 in coordination with the section outlines of step 64. These storyboards are for the purpose of forcing one to read the Request for Proposal (RFP), answer the mail, and communicate clearly with the customer.

A wall review of the storyboard is conducted at step 74 and draft topics are prepared at step 76 which will be presented to the customer. At this stage, a team of seller's employees having a member representing a mock customer is introduced, and the team participates in a wall review of the draft at step 78. The draft 112 is edited at step 80 and a wall review of the proof/galley is prepared at step 82. A wall review including the mock customer occurs at step 84, and a final review and printing are conducted at step 86.

Step 88 involves the decision to submit the proposal. If the proposal is not submitted (NO), the business development database is amended with the appropriate information and feedback is provided to the team at step 90. If a question remains as to whether or not to submit the proposal (MAYBE), possible modifications are considered and discussions with the customer occur at step 92. If the proposal is submitted (YES), a presentation is prepared for the actual customer or buyer at step 94. Additionally at step 94, negotiations can begin on the work contained in the proposal.

The success of the proposal is addressed in step 96. If the proposal is not successful (NO), a post-review is conducted with the team and the actual customer at step 98. If the customer is not available, the proposal leader should bring comments from the customer, addressing the rationale for rejection of the proposal. This information is also entered in the business development database at step 100. If no positive determination can yet be made regarding the success of the proposal (MAYBE), the modifications and customer discussions of step 92 are revisited.

If the proposal is successful (YES), the final step is to execute the work at step 102. The execution of the work is the responsibility of the division. Success or failure of an opportunity is entered into the database and used to establish risk criteria used in step 32.

There are four tools used in the business development process, as depicted in Table 4.

TABLE 4

Business Development Process Tools

| Number | Name | Description |
| --- | --- | --- |
| 1 | Opportunity Analysis | Determines whether an idea is either an idea or an opportunity. |
| 2 | Risk/Reward Assessment | Identifies the risk and the reward of an opportunity. |
| 3 | Code 31B Task Sheet | Used by Code 31B to request support from within the divisions. |
| 4 | Capture Plan | Provides a plan for proposal development, POCs, Return on Investment, and Action Items. |

The Surface Undersea Warfare Department (Code 31) at NUWC Division Newport has, in accordance with the described flow diagram of FIG. 1 and related discussion, particularly adopted a standard process for all new business development in the department that injects new thinking into the idea of business development. This process can be both exciting and rewarding to execute. The process allows innovators to pursue ideas, and determine the opportunities that have presented themselves. This promotes more innovation, as engineers can better understand where their ideas go and how they are developed. The process assesses the risks and rewards, compares that assessment to a baseline of proven successful opportunities, and helps determine the next step. This invites more effective strategic planning, commitment of resources, and overall planning.

In view of the above detailed description, it is anticipated that the invention herein will have far reaching applications other than those of a business plan applicable only to the Navy.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed is:

1. A business development process for an organization utilizing a business development database comprising the steps of:

collecting data for ideas from a plurality of sources;
 identifying core equities of the organization;
 filtering said collected idea data by identifying potential business opportunities as those collected ideas that fall within the identified core equities;
 performing an opportunity analysis on said identified potential business opportunities to determine valid business opportunities, wherein said step of performing an opportunity analysis includes the steps of:

grading strengths and weaknesses of the identified potential business opportunity, said grading occurring in areas of the market, economics, competitive advantage, the team, and potential flaws, each area including plural criteria and high/low attractive assessments for each;

entering project identifying information into a computer for creating a master form;

automatically summarizing graded areas on the master form;

archiving opportunities having an overall low attractive summarized score; and forwarding identified potential business opportunities having an overall high attractive summarized score as valid business opportunities;

committing resources to said valid business opportunities;

developing a business proposal for said valid business opportunities;

submitting said developed business proposal to a potential buyer of said valid business opportunity;

determining if submission of said developed business proposal is a success; and executing said business opportunity upon determining that the submission is a success.

2. The process according to claim 1 further comprising the step of representing each area by a separate electronic worksheet wherein the step of grading includes assigning a numeric value to each criteria according to project parameters, computing a score for that worksheet and transferring the computed score to the master form.

3. The process according to claim 2 wherein market criteria include customers, user benefits, value added, product life, timing, market structure, funding potential, and potential market share.

4. The process according to claim 3 wherein economic criteria include time to break even, return on investment potential, capital requirements, impact on staffing, room for error, and funding structure.

5. The process according to claim 3 wherein competitive advantage criteria include fixed and variable costs; control over costs; prices and distribution; barriers to entry by proprietary protection, lead time, legal and contractual issues, availability of contacts and networks, availability of key people, specialized criteria for an applicable industry; and a level of technology and concept.

6. The process according to claim 3 wherein team criteria include having an entrepreneurial team, industry or technical experience, integrity, intellectual honesty, and stress tolerance.

7. The process according to claim 3 wherein potential flaw criteria include real customer, under promise-over deliver, a right corporate culture, a motivated team with correct skills, a correct market, confidence, engineering of product, stress tested properly, good subcontracting suppliers, trying to do too much, an experienced team, right location, price in line with competition, market window, competition, authority to act given to team, project within Code of Federal Regulations, a contractually fixed price, funding available prior to work startup, and available resources.

8. A business development process for an organization utilizing a business development database comprising the steps of:
collecting data for ideas from a plurality of sources;
identifying core equities of the organization;
filtering said collected idea data by identifying potential business opportunities as those collected ideas that fall within the identified core equities;
performing an opportunity analysis on said identified potential business opportunities to determine valid business opportunities;
wherein said step of performing an opportunity analysis further comprises conducting a risk and reward assessment step including:
developing risk benchmark values for a combined plurality of risk criteria including new product, new customer, cooperative existing customer, team, time to meet milestone and deliverables, funding limited, customer pain, and internal process;
identifying a risk factor in relation to said risk benchmark value for each of said plurality of risk criteria;
developing reward benchmark values from a combined plurality of reward criteria including sustains/grows core equity, addresses critical need, new business development, competitive advantage, increase market share, and increase professional reputation;
identifying a reward factor in relation to the reward benchmark value for each of the plurality of reward criteria;
automatically updating a master sheet with calculated risk and reward factors; and
performing a final assessment of said valid business opportunities based on said master sheet for an action selected from the group consisting of GO, NO GO, and MAYBE;
committing resources to said finally assessed valid business opportunities having an action indicated as GO;
developing a business proposal for said valid business opportunities;
submitting said developed business proposal to a potential buyer of said valid business opportunity;
determining if submission of said developed business proposal is a success; and
executing said business opportunity upon determining that the submission is a success.

9. The process according to claim 8 wherein the final assessment action of "GO" is followed by the steps of:
identifying a potential customer;
establishing a rapport with the identified potential customer;
logging customer information into the database;
isolating problems and priorities in connection with the identified customer; and
installing a capture team and a lead for the capture team for the identified customer.

10. A business development process for an organization utilizing a business development database comprising the steps of:
collecting data for ideas from a plurality of sources;
identifying core equities of the organization;
filtering said collected idea data by identifying potential business opportunities as those collected ideas that fall within the identified core equities;
performing an opportunity analysis on said identified potential business opportunities to determine valid business opportunities;
committing resources to said valid business opportunities;
developing a business proposal for said valid business opportunities;
submitting said developed business proposal to a potential buyer of said valid business opportunity;
determining if submission of said developed business proposal is a success; and
executing said business opportunity upon determining that the submission is a success;
wherein said step of committing resources includes the steps of:

conducting meetings to determine availability of resources;

rendering a decision on one of an action to commit resources, not to commit resources, and maybe commit resources;

adding relevant information to said business development database, providing feedback to a capture team and archiving unused data if a decision not to commit resources is made;

returning opportunity to the capture team if a decision to maybe commit resources is made;

completing a task sheet requesting support;

forwarding the completed task sheet to a selected company division; and completing a capture plan in said business development database.

11. The process according to claim 10 wherein said task sheet includes identifying information about a contact, actions logged into said business development database, request being made, additional information and guidance, resources required, and requested due date.

12. The process according to claim 11 wherein said step of completing a capture plan includes entering information into capture plan worksheets, said capture plan worksheets containing information related to: buyer's need; the buyers; the internal capture team; information required about the need; information required about the buyer; information required about the money available; information required on a competitor; the abilities of the competitor; internal investment required; internal return on investment; the response to the need; best sales argument; key and ghosting discriminators; return on investment analysis; the team; salespersons for each buyer; pre-selling contact plan; potential questions, objections and responses; several appropriate closing proposal approaches; and elements of sales presentation.

13. A business development process for an organization utilizing a business development database comprising the steps of:

collecting data for ideas from a plurality of sources;

identifying core equities of the organization;

filtering said collected idea data by identifying potential business opportunities as those collected ideas that fall within the identified core equities;

performing an opportunity analysis on said identified potential business opportunities to determine valid business opportunities;

committing resources to said valid business opportunities;

developing a business proposal for said valid business opportunities;

submitting said developed business proposal to a potential buyer of said valid business opportunity;

determining if submission of said developed business proposal is a success; and executing said business opportunity on determining that the submission is a success;

wherein said step of developing a proposal includes further steps of:

assigning a proposal number in said business development database;

completing a modular proposal process; and performing a final review of the modular proposal to produce a final proposal.

14. The process according to claim 13 wherein said modular proposal process includes the steps of:

evaluating customer knowledge;

reviewing evaluation criteria;

identifying strengths, weaknesses, opportunities, and threats;

proposing a winning strategy;

developing organization and content of the proposal;

outlining sections of the proposal;

reviewing product designs;

identifying section strategies;

building compliance sheets;

assembling storyboards from section strategies, compliance sheets, and section outlines;

conducting a storyboard wall review from said storyboards;

drafting topics for discussion with a customer;

introducing an early review of drafted topics by an early review team including a mock customer;

conducting a wall review of the drafted topics;

editing the drafted topics;

conducting a wall review for proofing;

conducting a wall review with the early review team;

performing a final review; and generating a final proposal.

* * * * *